(12) United States Patent
Koyama et al.

(10) Patent No.: US 12,083,844 B2
(45) Date of Patent: Sep. 10, 2024

(54) AIR SUSPENSION SYSTEM AND CAMERA CLEANING SYSTEM

(71) Applicant: Hitachi Automotive Systems, Ltd., Hitachinaka (JP)

(72) Inventors: Masaki Koyama, Tokyo (JP); Kaito Hotta, Tokyo (JP); Wataru Hatsuse, Tokyo (JP); Tsutomu Ito, Hitachinaka (JP); Yoshinori Kawai, Hitachinaka (JP); Takahiro Suzuki, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 972 days.

(21) Appl. No.: 16/980,529

(22) PCT Filed: Oct. 10, 2018

(86) PCT No.: PCT/JP2018/037671
§ 371 (c)(1),
(2) Date: Sep. 14, 2020

(87) PCT Pub. No.: WO2019/187258
PCT Pub. Date: Oct. 3, 2019

(65) Prior Publication Data
US 2021/0001678 A1   Jan. 7, 2021

(30) Foreign Application Priority Data

Mar. 28, 2018 (JP) ................................. 2018-061264

(51) Int. Cl.
*B60G 17/015* (2006.01)
*B60S 1/60* (2006.01)
(Continued)

(52) U.S. Cl.
CPC ............ *B60G 17/0155* (2013.01); *B60S 1/60* (2013.01); *F04B 35/04* (2013.01); *B60W 10/22* (2013.01); *B60W 10/30* (2013.01)

(58) Field of Classification Search
CPC ............ B60G 17/0155; B60G 2400/51; B60G 17/052; B60G 2500/205; B60G 2500/30;
(Continued)

(56) References Cited

U.S. PATENT DOCUMENTS 9,538,054 B2 * 1/2017 Hayakawa ................ B60S 1/52
2005/0249667 A1 * 11/2005 Tuszynski ................ A61N 7/00
424/9.3

(Continued)

FOREIGN PATENT DOCUMENTS

DE   10 2013 113 555 A1   6/2015
JP       2002-005495 A     1/2002
(Continued)

OTHER PUBLICATIONS

Integration of Alternative Sources of Energy, Felix A. Farret; M. Godoy Simões Book Type: Wiley-IEEE Press, ISBN (Online): 9780471755623, IISBN (Electronic): 9780471755616, ISBN (Paper): 9780471712329, Digital Object Identifier: 10.1002/0471755621 (Year: 2006).*

(Continued)

*Primary Examiner* — Donald J Wallace
*Assistant Examiner* — Jalal C Coduroglu
(74) *Attorney, Agent, or Firm* — Foley & Lardner LLP

(57) ABSTRACT

A highly reliable and highly efficient air suspension system for a vehicle is provided by improving the trackability of stroke control with respect to pressure fluctuations applied to a linear compressor, suppressing stroke increase due to pressure drop, preventing piston collision, and increasing a flow rate by reducing dead volume. To realize this, the air suspension system includes an air suspension that supplies and discharges compressed air to adjust a length, a compressor body in which a piston reciprocates in a cylinder to compress air, a linear motor that reciprocates the piston, a (Continued)

tank that is connected to the air suspension or the compressor body and stores compressed air, a solenoid valve that opens and closes the air suspension or the tank, and an inverter that changes power supplied to the linear motor according to an open and closed state of the solenoid valve to perform position control of the piston.

14 Claims, 8 Drawing Sheets

(51) Int. Cl.
*B60W 10/22* (2006.01)
*B60W 10/30* (2006.01)
*F04B 35/04* (2006.01)

(58) Field of Classification Search
CPC ........ B60G 2800/914; B60S 1/60; B60S 1/54; B60S 1/56; F04B 35/04; F04B 35/045; B60W 10/22; B60W 10/30
See application file for complete search history.

(56) References Cited

U.S. PATENT DOCUMENTS

| 2006/0049606 | A1 | 3/2006 | Geiger | |
|---|---|---|---|---|
| 2006/0110259 | A1 | 5/2006 | Puff | |
| 2011/0061411 | A1* | 3/2011 | Kim | F04B 53/08 417/415 |
| 2015/0203077 | A1 | 7/2015 | Gokan | |
| 2015/0296108 | A1* | 10/2015 | Hayakawa | G02B 27/0006 348/148 |
| 2016/0103316 | A1* | 4/2016 | Rousseau | G02B 27/0006 359/509 |
| 2016/0311420 | A1 | 10/2016 | Assmann et al. | |
| 2017/0033726 | A1* | 2/2017 | Yamamoto | H02P 29/028 |
| 2018/0015907 | A1* | 1/2018 | Rice | B60S 1/52 |
| 2018/0304718 | A1* | 10/2018 | Seto | F04B 39/0005 |
| 2019/0085841 | A1* | 3/2019 | Ito | B60G 17/0155 |
| 2020/0188965 | A1* | 6/2020 | Monrad | B60S 1/20 |
| 2021/0001678 | A1* | 1/2021 | Koyama | B60S 1/54 |

FOREIGN PATENT DOCUMENTS

| JP | 2009083546 | A | * | 4/2009 |
|---|---|---|---|---|
| JP | 2012-163106 | A | | 8/2012 |
| JP | 6090318 | B2 | | 2/2017 |
| JP | 2017-061235 | A | | 3/2017 |
| JP | 2018016141 | A | * | 2/2018 |
| JP | 2020044979 | A | * | 3/2020 |
| WO | WO-2014/010578 | A1 | | 1/2014 |

OTHER PUBLICATIONS

Office Action issued in corresponding Japanese Patent Application No. 2018-061264 dated Dec. 28, 2021 with English translation.
Office Action issued in corresponding German Patent Application No. 11 2018 007 017.4 dated Oct. 11, 2021 with English translation.
International Search Report with English translation and Written Opinion issued in corresponding application No. PCT/JP2018/037671 dated Jan. 15, 2019.

* cited by examiner

AIR SUSPENSION SYSTEM AND CAMERA CLEANING SYSTEM

TECHNICAL FIELD

The present invention relates to a compressed air system that controls the operation of each part of a vehicle by controlling the amount of compressed air supplied, and in particular, to an air suspension system that adjusts a vehicle height of a vehicle such as a four-wheeled vehicle, or a camera cleaning system that adjusts a discharge amount of cleaning liquid that cleans a lens surface of an on-vehicle camera.

BACKGROUND ART

As an air suspension system for adjusting a vehicle height of a vehicle, there is a system that employs a configuration of using a reciprocating linear motor as a power source of a compressor that generates compressed air (PTL 1). Further, a camera cleaning system that cleans a lens surface of an on-vehicle camera using compressed air is also known (PTL 2).

For example, the abstract of PTL 1 discloses, as an air suspension system that "facilitates startup under conditions where a differential pressure exists in a compressor", "an air suspension system that supplies air compressed by a compressor to a plurality of air chambers that are interposed between a vehicle body side and a wheel side and adjust a vehicle height according to supply and discharge of air, wherein the compressor includes a movable element that is connected to a piston and extends in a moving direction of the piston, and an armature that reciprocates the movable element in the moving direction of the piston."

CITATION LIST

Patent Literature

PTL 1: JP 2017-61235 A
PTL 2: Japanese Patent No. 6090318

SUMMARY OF INVENTION

Technical Problem

However, PTL 1, which linearly drives a piston of a compressor using a linear motor, shows what is called a free piston structure, in which the positions of the top dead center and the bottom dead center of the piston are determined by the drive control of the linear motor (stroke control of the movable element). Accordingly, it is difficult to control the stroke that follows a load change in an air suspension system in which the load of the compressor changes momentarily, and when the load suddenly changes, there has been a case where the piston and a cylinder collide or the discharge flow rate decreases.

The present invention has been made in view of the above-mentioned point, and an object of the present invention is to provide a highly reliable and highly efficient air suspension system or a camera cleaning system in which, even when the load of the linear compressor suddenly changes, a collision between a piston and a cylinder is prevented at the time the load is reduced and the dead volume is reduced and the discharge flow rate is increased at the time the load is increased by linear motor control that immediately follows the load.

Solution to Problem

To solve the above problem, the air suspension system of the present invention includes an air suspension that supplies and discharges compressed air to adjust a length, a compressor body in which a piston reciprocates in a cylinder to compress air, a linear motor that reciprocates the piston, a tank that is connected to the air suspension or the compressor body and stores compressed air, a solenoid valve that opens and closes the air suspension or the tank, and an inverter that changes power supplied to the linear motor according to an open and closed state of the solenoid valve to perform position control of the piston.

Further, a camera cleaning system according to the present invention includes a camera cleaning device that discharges cleaning liquid by supplying and discharging compressed air, a compressor body in which a piston reciprocates in a cylinder to compress air, a linear motor that reciprocates the piston, a solenoid valve that opens and closes the air suspension, and an inverter that changes power supplied to the linear motor according to an open and closed state of the solenoid valve to perform position control of the piston.

Advantageous Effects of Invention

According to the present invention, the linear motor control according to the operating condition of the linear compressor can prevent the collision between the piston and the cylinder, and can make the air suspension system quiet and highly reliable. Further, by reducing the dead volume and increasing the discharge flow rate, it is possible to provide an air suspension system capable of highly efficient and highly responsive vehicle height adjustment. Furthermore, it is possible to provide an air suspension system for a vehicle that enables mode driving such as high-speed driving, energy-saving driving, and silent driving according to the driver's or host system's requirements.

DESCRIPTION OF EMBODIMENTS

Hereinafter, an embodiment of the present invention will be described with reference to the drawings. Note that the following is merely an example of the embodiment and is not intended to limit the content of the invention to specific embodiments described below. The invention itself can be implemented in various modes according to the contents described in claims.

First Embodiment

An air suspension system according to a first embodiment of the present invention will be described with reference to FIGS. 1 to 5.

Figure 1:
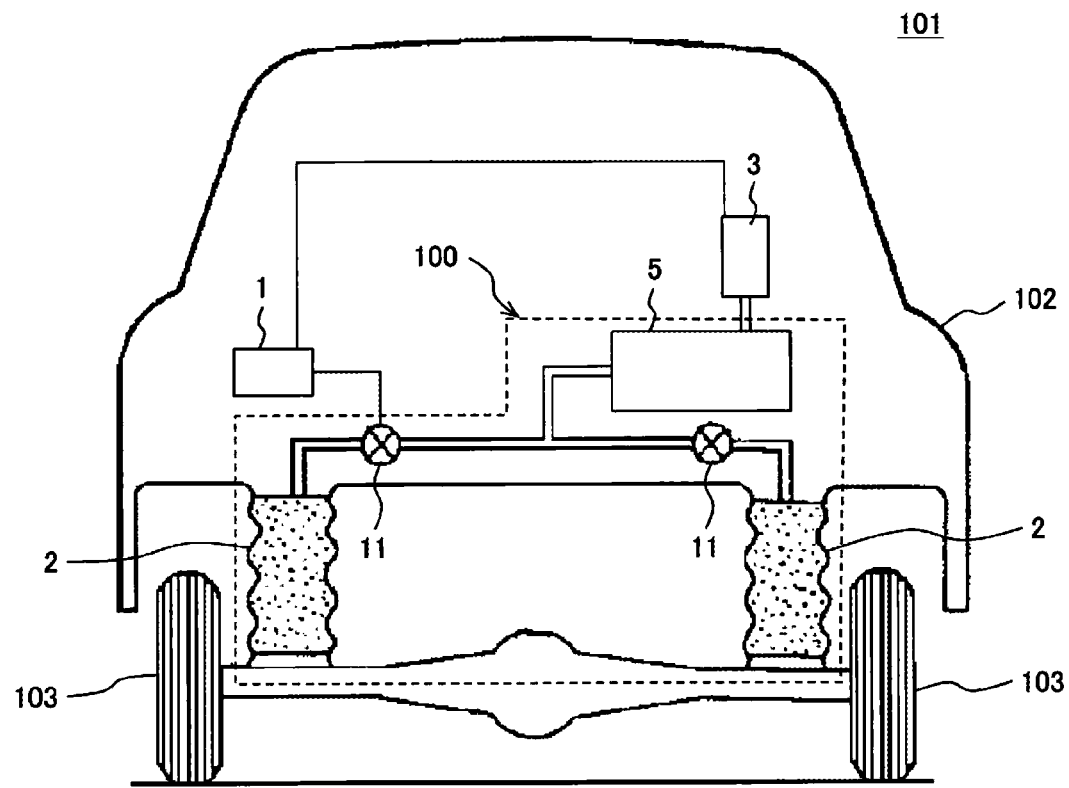
FIG. 1 is a configuration diagram of a general vehicle air suspension.

FIG. 1 is a configuration diagram of a vehicle 101 such as a four-wheeled vehicle equipped with an air suspension 2 on front, rear, left, and right wheels. Hereinafter, the air suspension system of the present embodiment will be described by taking the case where it is applied to the vehicle 101 as an example.

As shown in FIG. 1, a total of four wheels 103, which are the front left and right wheels and the rear left and right wheels, are provided on the lower side of a vehicle body 102 that is the body of the vehicle 101. This vehicle 101 includes an electronic control unit (ECU) 1, a linear compressor 3, and a pneumatic circuit 100, which will be described later. By using these, the vehicle height of the vehicle 101 can be moved up and down according to a driver's instruction.

The linear compressor 3 compresses and discharges sucked air, and is obtained by linearly connecting a compressor body 3A and a linear motor 3B. Note that, when mounted on the vehicle 101, the linear compressor 3 is preferably attached so that a vibration direction of a piston of the compressor body 3A and a movable element of the linear motor 3B is a vertical direction.

The pneumatic circuit 100 is a circuit that moves the vehicle 101 up and down using compressed air, and is composed of four air suspensions 2 provided between the vehicle body 102 and the wheels 103, a tank 5 that stores compressed air, and a solenoid valve such as a suspension control valve 11 that opens and closes an air passage of the air suspension 2.

The ECU 1 controls the linear compressor 3 and the pneumatic circuit 100 based on a driver's command, and appropriately supplies and discharges compressed air to and from each of the air suspensions 2 to adjust the vehicle height to a desired height.

Figure 2:
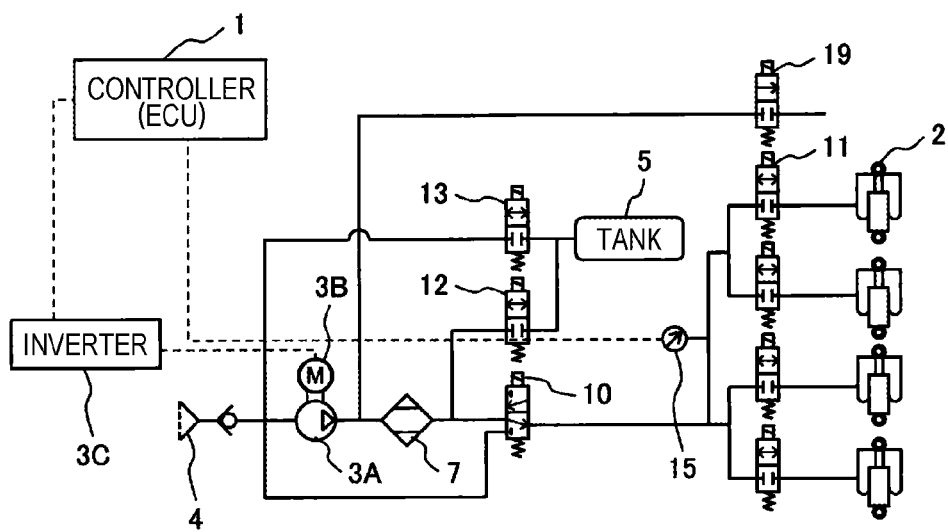
FIG. 2 is a circuit configuration diagram of an air suspension system of a first embodiment.

FIG. 2 is a circuit configuration diagram of the air suspension system of the present embodiment mounted on the vehicle 101 of FIG. 1, mainly including the ECU 1, the linear compressor 3, and the pneumatic circuit 100 (the air suspension 2, the tank 5, and a solenoid valve such as the suspension control valve 11). Here, the linear compressor 3 has the compressor body 3A that is a part that compresses air, the linear motor 3B that is a part that supplies power, and an inverter 3C that is a part that supplies power. Further, a suction port 3D and a discharge port 3E are connected to the compressor body 3A, and the outside air sucked through an intake filter 4 and the suction port 3D is compressed in the compressor body 3A and then converted into compressed air, and is discharged from the discharge port 3E.

The tank 5 stores air compressed by the linear compressor 3, and the discharge port 3E of the linear compressor 3 and the tank 5 are connected via a tank opening and closing valve 12 which is a two-port two-position solenoid valve. The compressed air stored in the tank 5 can be supplied to the air suspension 2 via the suspension control valve 11 described later and the like.

An air dryer 7 removes moisture contained in the compressed air discharged by the linear compressor 3 and dries it, and has the inside filled with a desiccant (not shown) such as silica gel. Therefore, the dry compressed air that has passed through the air dryer 7 is stored in the tank 5, and the dry compressed air is also supplied to the air suspension 2.

A supply and discharge switching valve 10 is a three-port two-position solenoid valve that selectively switches between supplying compressed air to the air suspension 2 and discharging compressed air from the air suspension 2. The supply and discharge switching valve 10 and each solenoid valve described later are connected to the ECU 1 by a signal line in order to transmit a solenoid valve opening and closing instruction and a solenoid valve opened and closed state. However, in FIG. 2, illustration of a signal line connecting the ECU 1 and each solenoid valve is omitted.

The suspension control valve 11 is a two-port two-position solenoid valve provided between the air suspension 2 and the supply and discharge switching valve 10, and switches between opening and closing of a passage that supplies and discharges compressed air to and from the air suspension 2 according to an instruction from the ECU 1 to control whether or not the air suspension 2 can expand or contract.

The tank opening and closing valve 12 is a two-port two-position solenoid valve, and opens and closes a passage connecting the discharge port 3E of the linear compressor 3 and the tank 5. Further, a tank return opening and closing valve 13 is a two-port two-position solenoid valve that opens and closes a passage that connects the suction port 3D of the linear compressor 3 and the tank 5.

A pressure sensor 15 is provided between the supply and discharge switching valve 10 and the suspension control valve 11 and senses ambient pressure. For example, when the suspension control valve 11 is open, the pressure in the air suspension 2 in an open state is sensed. On the other hand, when the suspension control valve 11 is closed, the supply and discharge switching valve 10 is in the discharge position for discharging the air in the air suspension 2, and the tank return opening and closing valve 13 is open, the pressure in the tank 5 is sensed.

The ECU 1 is a controller that controls the air suspension system, and controls each solenoid valve and the linear compressor 3 so that the vehicle height is as instructed by the driver. Specifically, based on a command from the ECU 1, the opening and closing operation of each of the solenoid valves which are the supply and discharge switching valve 10, the suspension control valve 11, the tank opening and closing valve 12, the tank return opening and closing valve 13 is controlled, and ON and OFF of drive of the linear compressor 3 is also controlled. At this time, the ECU 1 optimizes the control of the linear compressor 3 based on the sensing information of the pressure sensor 15 and the opened and closed state of each solenoid valve.

Next, the detailed structure of the linear compressor 3 will be described with reference to the schematic diagrams of FIGS. 3A and 3B.

Figure 3A:
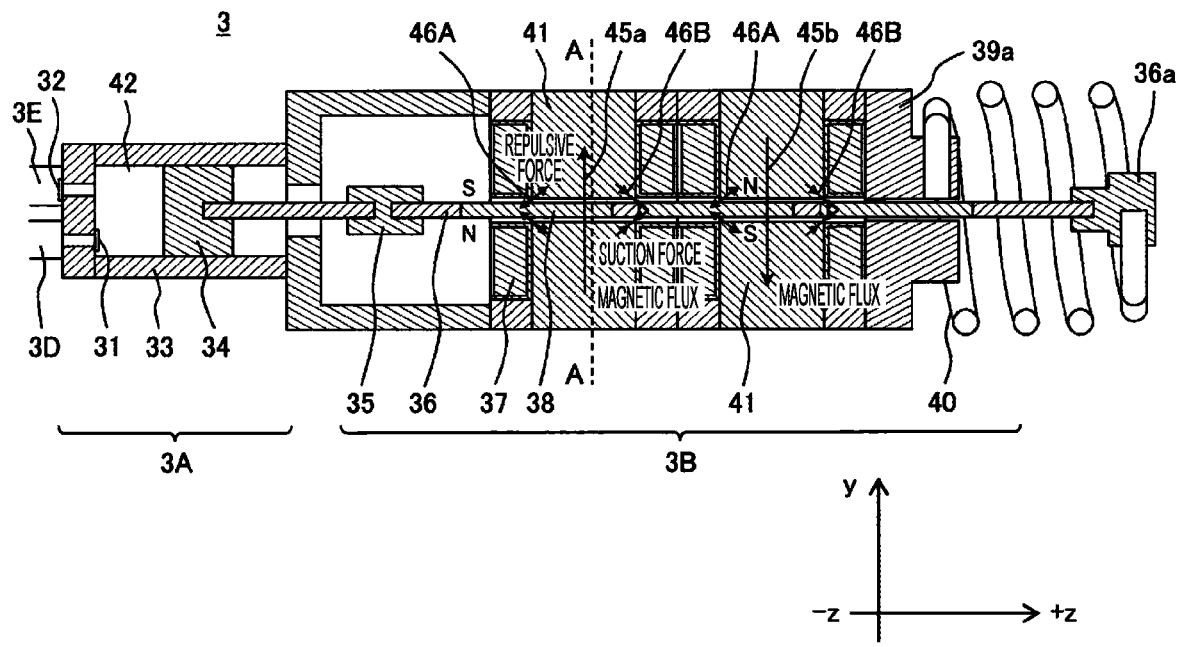
FIG. 3A is a cross-sectional view (side view) showing a linear compressor configuration according to the first embodiment.

FIG. 3A is a cross-sectional view of the linear compressor 3 taken along a yz plane. As shown here, the linear compressor 3 has a compressor body 3A and a linear motor 3B disposed linearly. The compressor body 3A has a cylinder 33 and a piston 34 that slides inside the cylinder 33, and a compression chamber 42 is formed by an inner surface of the cylinder 33 and an end surface of the piston 34. The compression chamber 42 communicates with the suction port 3D via an intake valve 31 and communicates with the discharge port 3E via an exhaust valve 32. The intake valve 31 allows only one-way flow from the suction port 3D to the compression chamber 42, and the exhaust valve 32 allows only one-way flow from the compression chamber 42 to the discharge port 3E. With such a configuration, the air sucked from the suction port 3D can be compressed in the compression chamber 42 and discharged to the discharge port 3E.

Figure 3B:
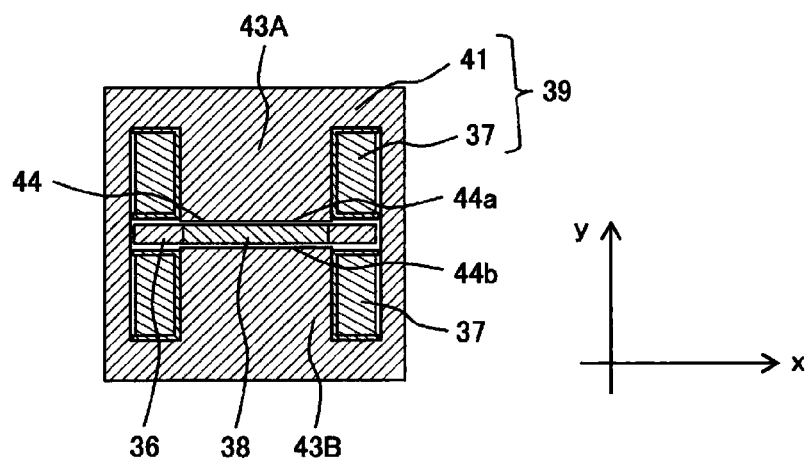
FIG. 3B is a cross-sectional view (front view) showing the linear compressor configuration according to the first embodiment.

Further, FIG. 3B is a cross-sectional view of the linear motor 3B taken along the position AA in FIG. 3A.

As shown here, the linear motor 3B includes a stator 39 including an iron core 41 and a coil 37, a movable element 36 to which a permanent magnet 38 is fitted, and the like. The iron core 41 has a rectangular outer shape when the cross section is viewed from the front, and has an inner side provided with an upper magnetic pole tooth portion 43A extending from an upper side to a lower side, a lower magnetic pole tooth portion 43B extending from the lower side to the upper side, and a gap 44 sandwiched between them.

Then, the coil 37 is wound around each of the upper magnetic pole tooth portion 43A and the lower magnetic pole tooth portion 43B, and, with the plate-shape movable element 36 disposed in the gap 44, the linear motor 3B in which the movable element 36 vibrates in a z direction of FIG. 3A is constituted. Note that, as shown in FIG. 3B, since a gap 44a between the upper magnetic pole tooth portion 43A and the movable element 36 and a gap 44b between the lower magnetic pole tooth portion 43B and the movable element 36 are provided, the movable element 36 can reciprocate without coming into contact with the stator 39.

As shown in FIG. 3A, the stator 39 has a shape that is long in the z direction, and has a plurality of the same configurations arranged in the z direction (two in the example of FIG. 3A). Further, the movable element 36 is disposed so as to be movable in the z direction with respect to the stator 39 by a linear guide or the like (not shown), and an end portion 36a of the movable element 36 and an end portion 39a of the stator 39 are connected by a spring 40. With this configuration, when the movable element 36 moves closer to a right side than a natural length of the spring 40, a spring force acts in a −z direction, and when it moves closer to a left side, the spring force acts in a +z direction.

Here, the coil 37 is connected so that a magnetic flux in an opposite direction is generated in the adjacent iron core 41 when a current flows. For example, at the moment when an upward magnetic flux 45a is generated in the iron core 41 on the left in FIG. 3A, a downward magnetic flux 45b is generated in the iron core 41 on the right. When such a magnetic flux is generated, a repulsive force 46A and a suction force 46B are generated between the stator 39 and the movable element 36, and the movable element 36 moves in a predetermined direction. In this way, by appropriately changing a direction and magnitude of a current flowing in the coil 37, a desired force in the +z direction or the −z direction can be generated in the movable element 36, and the movable element 36 can be caused to execute a desired reciprocating motion.

Since one end of the movable element 36 is connected to the piston 34 with a connection portion 35 interposed between them, the piston 34 also reciprocates in conjunction with the movable element 36. In a process in which the compression chamber 42 expands, air is sucked from the suction port 3D, and in a process in which the compression chamber 42 contracts, air is compressed and then discharged as compressed air from the discharge port 3E. In this way, the linear compressor 3 can perform air suction, compression, and discharge operations.

Next, optimum control of the linear compressor 3 according to the present embodiment will be described with reference to FIG. 3C.

First, a case where the control of the present embodiment is not applied will be described with reference to FIG. 3C(a). Here, the stroke (amplitude) of the movable element 36 is suppressed so that the piston 34 does not collide with the cylinder 33 even in a case where the load of the linear compressor 3 suddenly decreases. Therefore, when the load is large, the dead point of the piston 34 does not come close enough to the head of the cylinder 33. Accordingly, the dead volume 42a of the compression chamber 42 becomes large and compressed air cannot be discharged sufficiently. As described above, in a case where the control of the present embodiment is not applied, a situation in which the discharge flow rate and the compression efficiency suitable for the specifications of the compressor body 3A cannot be secured may occur.

On the other hand, in the control of the present embodiment, the ECU 1 grasps the load state of the linear compressor 3 in real time. Accordingly, the reciprocating motion control of the movable element 36 can be optimized based on the present or future load state, and the dead volume 42a can be made as small as possible regardless of the magnitude of the load. For example, when the load is small, the linear motor 3B is controlled so that the strokes of the piston 34 and the movable element 36 are large (FIG. 3C(b)), and when the load is large, the linear motor 3B is controlled so that the strokes of the piston 34 and the movable element 36 are small, and the center position of these amplitudes approach the header of the cylinder 33 by a predetermined distance 5 (FIG. 3C(c)). By such control, almost all the compressed air in the compression chamber 42 can be discharged regardless of the load state, and the discharge flow rate and the compression efficiency suitable for the specifications of the compressor body 3A can be secured.

The air suspension system of the present embodiment uses the linear compressor 3 to which the control illustrated in FIGS. 3C(b) and 3C(c) is applied, and the details of its operation will be described below with reference to FIG. 2 and the like.

First, in a case where compressed air is not sufficiently stored in the tank 5, the linear compressor 3 is operated in a state where the supply and discharge switching valve 10 is held at the discharge position, the suspension control valve 11, the tank return opening and closing valve 13, and an exhaust passage opening and closing valve 19 are held at a closed position, and, further, the tank opening and closing valve 12 is held in an open position.

At this time, the operation of the linear compressor 3 is performed as described below. Before the operation of the linear compressor 3, as shown in FIG. 3A, the piston 34 and the movable element 36 are at a neutral position where the force is balanced determined mainly by the force of the spring 40 and the air pressure of the compression chamber 42 and the magnetic force generated by the permanent magnet 38. After the above, when a current for moving the movable element 36 in the +z direction is supplied to the coil 37 according to a command from the ECU 1, the piston 34 connected to the movable element 36 also moves in the +z direction. When the compression chamber 42 expands as the piston 34 moves in the +z direction, the pressure of the air in the compression chamber 42 decreases, and when the pressure on the compression chamber 42 side decreases below the pressure of the suction port 3D, the intake valve 31 opens and air enters the compression chamber 42 from the suction port 3D. At this time, the exhaust valve 32 maintains a closed state. As the movable element 36 moves in the +z direction, the spring 40 is compressed and the spring force in the −z direction increases. Further, the ECU 1 gradually reduces the supply current as the movable element 36 moves in the +z direction, and gradually increases the current in the opposite direction from a certain time point. Then, when the direction of the force applied by the stator 39 to the movable element 36 changes to the −z direction and the spring force in the −z direction also increases sufficiently, the moving direction of the movable element 36 reverses to the −z direction from a certain time point. After that, the compression chamber 42 shrinks in a state where both the intake valve 31 and the exhaust valve 32 are closed, so that the air in the compression chamber 42 is compressed and the pressure rises. Then, when the pressure in the compression chamber 42 becomes higher than the pressure in the discharge port 3E, the exhaust valve 32 opens, and the compressed air is sent to the discharge port 3E. By supplying a sinusoidal current to the coil 37 in synchronization with the resonance frequency of the movable element 36, the amplitude of the movable element 36 gradually increases, and the efficiency of air compression in the compression chamber 42 can also be gradually improved. The resonance frequency of the movable element 36 is roughly determined by the mass of the movable element 36 and the spring constant of the spring 40. When operated at this resonance frequency, the movable element 36 can reciprocate with a small amount of energy. Accordingly, it is preferable to send a command for the command voltage to be sent to the coil 37 to have this resonance frequency.

In this manner, the linear compressor 3 sucks the outside air through the intake filter 4, and compresses and discharges the outside air. The compressed air is dried by the air dryer 7 and then stored in the tank 5 through the tank opening and closing valve 12 held at the open position. Then, for example, when the pressure in the tank 5 reaches a certain pressure, the linear compressor 3 is stopped and the tank opening and closing valve 12 is switched to the closed position, so that the tank 5 can be filled with sufficient compressed air.

In a case of increasing the vehicle height of the vehicle 101, the tank return opening and closing valve 13 is kept closed and the exhaust passage opening and closing valve 19 is kept closed in a state where the linear compressor 3 is stopped. In this state, the supply and discharge switching valve 10 is switched to the supply side, and the tank opening and closing valve 12 and the suspension control valve 11 are opened. In this manner, the compressed air in the tank 5 is supplied to the air suspension 2, the pressure in the air suspension 2 rises, and the vehicle height starts to rise. After a predetermined time (zero to several seconds) elapses from this state, the linear compressor 3 is activated to suck the air in the tank 5 and supply the compressed air to the air suspension 2. The vehicle height of the vehicle 101 is detected by a vehicle height sensor (not shown) mounted on each wheel. After the vehicle height reaches a predetermined vehicle height, the suspension control valve 11 of each wheel is closed, and finally the supply and discharge switching valve 10 is switched to the discharge side and the tank opening and closing valve 12 is closed. In this manner, the air suspension 2 is sealed, so that the air suspension 2 can be maintained in the extended state and the vehicle height can be maintained in a state of being increased to a desired height.

On the other hand, in a case of lowering the vehicle height, the supply and discharge switching valve 10 is held on the discharge side, the exhaust passage opening and closing valve 19 is closed, and the tank opening and closing valve 12 is held closed. In this state, the tank return opening and closing valve 13 is switched to open and the suspension control valve 11 is opened. In this manner, the compressed air in the air suspension 2 moves to the tank 5, the pressure in the tank 5 rises, and the vehicle height starts to fall. After a predetermined time (zero to several seconds) elapses from this state, the linear compressor 3 is activated to suck the air in the air suspension 2 and supply the compressed air to the tank 5. As a result, the air in the air suspension 2 is discharged, and the air suspension 2 contracts, so that the vehicle height can be lowered. After the vehicle height lowering operation is completed, the suspension control valve 11 is switched to the closed position, the linear compressor 3 is stopped, and the tank return opening and closing valve 13 is closed. In this manner, the air suspension 2 is sealed, so that the air suspension 2 can be maintained in the contracted state and the vehicle height can be maintained in a state of being lowered to a desired height.

As described above, the vehicle height lowering operation of the air suspension system according to the present embodiment constitutes a closed circuit, in which the air discharged from the air suspension 2 is stored in the tank 5 using the linear compressor 3 without releasing it into the atmosphere, and the compressed air stored in the tank 5 is supplied to the air suspension 2 at the time of the vehicle height increasing operation.

On the other hand, in a case where the pressure in the tank 5 is lower than the atmospheric pressure during the vehicle height increasing operation, or in a case where the pressure in the air suspension 2 is lower than the atmospheric pressure during the vehicle height lowering operation, the outside air is sucked into the linear compressor 3 through the intake filter 4, and the outside air compressed by the linear compressor 3 is dried by the air dryer 7 and then supplied to the air suspension 2 or the tank 5.

Further, in a case where the pressure in the tank 5 becomes higher than a predetermined pressure (specified maximum pressure), the compressed air in the tank 5 is discharged from the exhaust passage. In this case, the supply and discharge switching valve 10 is held at the supply position, the tank opening and closing valve 12 is held at the closed position, and the tank return opening and closing valve 13 and the exhaust passage opening and closing valve 19 are opened. In this manner, the air discharged from the tank 5 flows from the tank return opening and closing valve 13 through the air dryer 7 to the exhaust passage opening and closing valve 19. In this manner, the moisture can be removed from the desiccant with which the air dryer 7 is filled, and the desiccant can be regenerated.

Figure 4A:
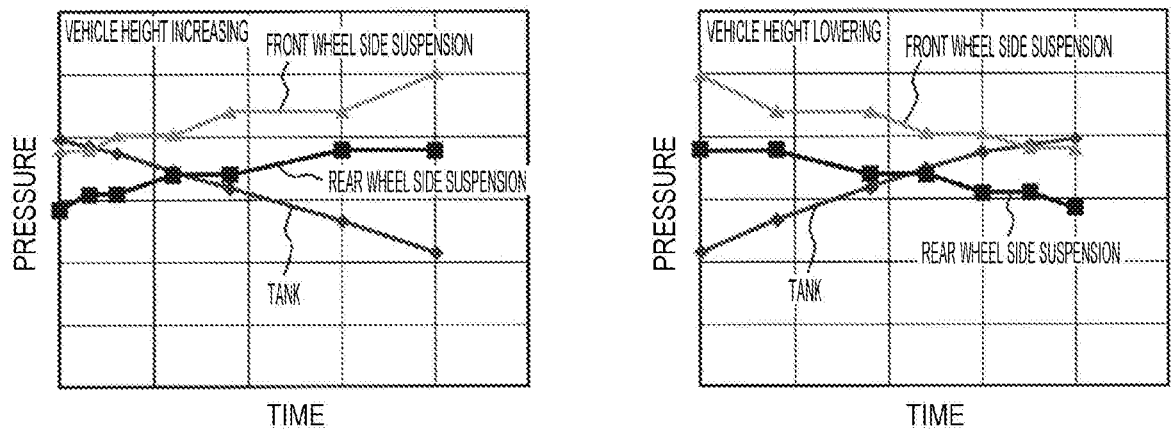
FIG. 4A is a diagram showing changes in suspension and tank pressures during operation of the air suspension of the first embodiment.
Figure 4B:
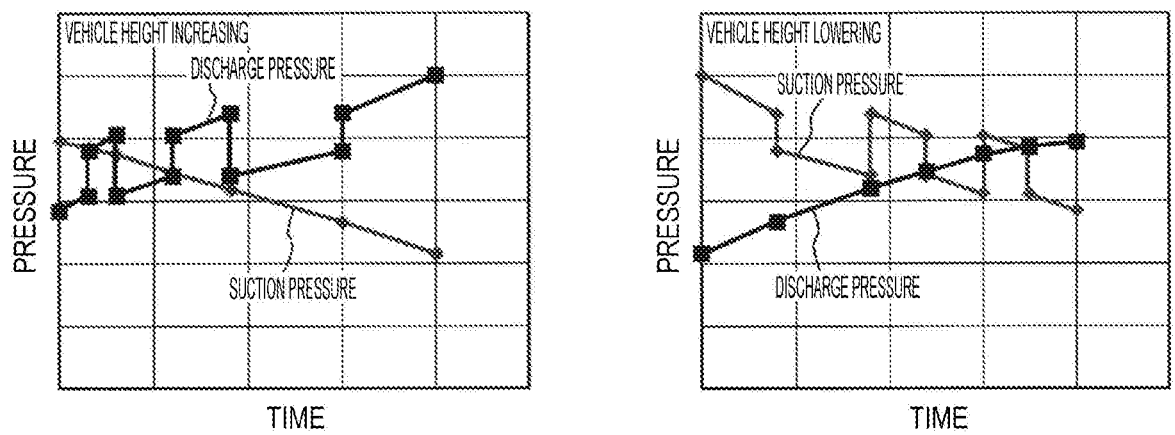
FIG. 4B is a diagram showing changes in suction pressure and discharge pressure during operation of the air suspension of the first embodiment.

Next, with reference to FIG. 4A and FIG. 4B, changes in pressures at various locations in the air suspension system of the present embodiment during the vehicle height increasing and lowering operation will be described. FIG. 4A shows changes in pressure of the air suspension 2 and the tank 5 at the time of the vehicle height increasing and lowering movement, and FIG. 4B shows changes in suction pressure and discharge pressure of the linear compressor 3 at that time. Here, the air suspension system of the present embodiment is configured to increase and lower the vehicle heights of the front and the rear alternately by complementarily opening and closing the front and rear suspension control valves 11 at the time of vehicle height increasing and lowering movement of the vehicle 101.

For example, when increasing the vehicle height, first, the suspension control valve 11 on the rear wheel side is opened, the suspension control valve 11 on the front wheel side is closed, and the compressed air in the tank 5 is supplied to the air suspension 2 on the rear wheel side. When the rear wheel side rises by a predetermined amount, the suspension control valve 11 on the rear wheel side is closed, and at the same time, the suspension control valve 11 on the front wheel side is opened, compressed air is supplied to the air suspension 2 on the front wheel side, and the front wheel side is raised by a predetermined amount. By repeating this alternately, both the front wheel side and the rear wheel side are gradually raised to the vehicle height instructed by the driver.

In a case where the air suspensions 2 that are the connection destination of the tank 5 are alternately switched during the vehicle height increasing operation, the pressure of the tank 5 gradually decreases consistently as shown in the left diagram of FIG. 4A. On the other hand, regarding the pressure of the air suspensions 2, a period in which the rear wheel side rises and the front wheel side is constant and a period in which the front wheel side rises and the rear wheel side is constant alternate. As a result, as shown in the left diagram of FIG. 4B, the suction pressure of the linear compressor 3 gradually decreases in conjunction with the pressure of the tank 5, while the discharge pressure of the linear compressor 3 communicating with the air suspension 2 rises on the whole while repeating instantaneous rise and fall in conjunction with the switching of the supply destination of the compressed air.

Further, when lowering the vehicle height, first, the compressed air in the air suspension 2 on the front wheel side is supplied to the tank 5, and, when the front wheel side decreases by a predetermined amount, the compressed air in the air suspension 2 on the rear wheel side is supplied to the tank 5 so that the rear wheel side is lowered by a predetermined amount. By repeating this alternately, both the front wheel side and the rear wheel side are gradually lowered to the vehicle height instructed by the driver.

In a case where the air suspensions 2 that are the connection destination of the tank 5 are alternately switched during the vehicle height lowering operation, the pressure of the tank 5 gradually increases consistently as shown in the right diagram of FIG. 4A. On the other hand, regarding the pressure of the air suspensions 2, a period in which the front wheel side is lowered and the rear wheel side is constant and a period in which the rear wheel side is lowered and the front wheel side is constant alternate. As a result, as shown in the right diagram of FIG. 4B, the discharge pressure of the linear compressor 3 gradually increases in conjunction with the pressure of the tank 5, while the suction pressure of the linear compressor 3 communicating with the air suspension 2 is lowered on the whole while repeating instantaneous rise and fall in conjunction with the switching of the supply source of the compressed air.

As described above, in a case where the vehicle heights of the front and rear of the vehicle 101 are alternately increased and lowered, the load of the linear compressor 3 suddenly changes in conjunction with the change in the connection state of the pneumatic circuit 100, and thus the stroke of the piston 34 may change along with the load change. For this reason, in the conventional control method that does not reflect a load state (FIG. 3C(a)), there is possibility that the piston 34 collides with the head of the cylinder 33 when the load suddenly decreases, or the stroke of the piston 34 suddenly decreases and the discharge flow rate decreases when the load suddenly increases. On the other hand, according to the control method of the present embodiment that reflects a load state (FIGS. 3C(b) and 3C(c)), since the stroke and position of the piston 34 can be adjusted according to the load, the appropriate dead volume 42a can be maintained even when the load changes suddenly, and collision between the piston 34 and the cylinder 33 and a decrease in discharge flow rate and compression efficiency can be avoided.

Figure 5:
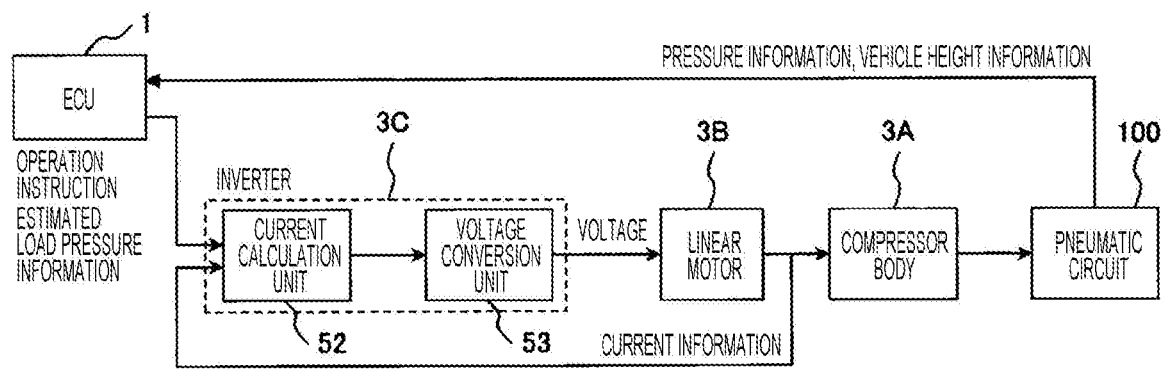
FIG. 5 is a control block diagram of the first embodiment.

Next, with reference to FIG. 5, a control block diagram of the present embodiment for realizing the control illustrated in FIGS. 3C(b) and 3C(c) will be described. As shown here, the ECU 1 is connected to the pneumatic circuit 100 and the inverter 3C, the pressure information and the vehicle height information are input from the pneumatic circuit 100, and the operation command and estimated load pressure information are output to the inverter 3C. Note that the estimated load pressure information is load pressure information (compression chamber pressure, discharge pressure, suction pressure) predicted by the ECU 1 based on input information (pressure information, vehicle height information) from the pneumatic circuit 100 and the current and future open and closed states of the solenoid valve.

The inverter 3C has a current calculation unit 52 and a voltage conversion unit 53. The current calculation unit 52 receives an operation command from the ECU 1 as well as the estimated load pressure information, and calculates and outputs a current value according to them. The voltage conversion unit 53 generates a necessary voltage based on the current value input from the current calculation unit 52 and supplies it to the linear motor 3B. As a result, a current corresponding to the estimated load pressure information flows through the coil 37 of the linear motor 3B, so that compression operation of the linear compressor 3 is performed to maintain the dead volume 42a of the compressor body 3A appropriately regardless of the state of the pneumatic circuit 100.

Here, the EUC 1 basically controls the stroke of the movable element 36 by the magnitude of the current flowing through the coil 37. However, since the stroke size fluctuates due to a pressure difference around the piston, it is necessary to use the pressure (or the discharge pressure, the suction pressure) in the compression chamber 42, or the like to estimate a more accurate stroke amount. Therefore, the ECU 1 estimates the pressure in the compression chamber 42 based on one or a combination of a plurality of pieces of sensor information of motor current, motor voltage, position, and the like, in addition to the operation command of each solenoid valve issued by the ECU 1 itself. This can be estimated, for example, by detecting a counter electromotive voltage due to an increase in load. Based on this pressure estimation value, the current calculation unit 52 is configured to change the current flowing through the coil 37.

As described above, according to the present embodiment, the drive frequency of the linear motor 3B, and the center position of the amplitude and the stroke of the piston 34 can be controlled in consideration of the estimated load of the linear compressor 3. Accordingly, even in a case where the load of the linear compressor 3 suddenly changes like at the time of switching between the air suspensions 2 on the front and the rear, it is possible to perform appropriate control according to the load change. Therefore, it is possible to realize a highly reliable and highly efficient air suspension system, in which there is no collision between the piston 34 and the cylinder 33 and reduction in the discharge flow rate can be suppressed.

Further, as shown in FIG. 2, the pressure sensor 15 is provided between the supply and discharge switching valve 10 and the suspension control valve 11. The information from the pressure sensor 15 can also be used when the pressure is estimated in the ECU 1. When the pressure sensor 15 is installed at this position, before the linear compressor 3 is started, either the tank opening and closing valve 12 or the tank return opening and closing valve 13 is opened depending on the open and closed state of the supply and discharge switching valve 10, so that the pressure inside 5 can be measured, and, after the linear compressor 3 is started, the pressure inside the air suspension 2 with the valve open can be measured depending on the open and closed state of the suspension control valve 11. That is, in the vehicle height increasing operation, the suction pressure before the operation of the linear compressor 3 and the successive discharge pressure after the operation can be measured. Further, in the vehicle height lowering operation, the discharge pressure before the operation of the linear compressor 3 and the successive suction pressure after the operation can be measured.

As shown in FIG. 4B, during either the vehicle height increasing operation and the vehicle height lowering operation, the pressure on the side where the pressure fluctuation occurs during the operation of the linear compressor 3 due to opening and closing of the suspension control valve 11 is successively measured, and, for the pressure on the tank 5 side where fluctuation does not occur, it is possible to know the suction pressure and discharge pressure of the linear compressor 3 by using only one pressure sensor by estimating the pressure during compressor operation from the initial pressure. By using the information from the pressure sensor 15, the ECU 1 can more accurately estimate the pressure around the piston and can perform more appropriate piston stroke control.

Further, the configuration may be such that the pressure in the compression chamber 42 is directly measured by a sensor or the like and taken in. Based on the pressure in the compression chamber 42, the configuration of changing a frequency in such a manner that the current calculation unit 52 changes the magnitude of the current flowing through the coil 37 and makes the frequency of the current higher as the pressure in the compression chamber is higher, and the like can be obtained.

Furthermore, information from a vehicle height sensor (not shown) provided in each of the air suspensions 2 can be used for pressure estimation inside the ECU 1. In this case, the pressure in the air suspension 2 can be estimated from the output of the vehicle height sensor by having, as data, the relationship between the output of the vehicle height sensor and the pressure in the air suspension 2 measured in advance in the ECU 1. At this time, for example, the pressure sensor 15 is disposed at a position between the tank 5 and either the tank opening and closing valve 12 or the tank return opening and closing valve 13 so that the pressure in the tank 5 can be constantly detected. In this manner, it is possible to successively measure and estimate the suction pressure and the discharge pressure at the time the linear compressor 3 is operated and perform the piston stroke control more appropriately.

According to the configuration of the present embodiment described above, the ECU 1 estimates the load of the linear compressor 3 based on the state of the pneumatic circuit 100, and the inverter 3C supplies the voltage based on the estimated load to the linear motor 3B. Therefore, the control of the linear compressor 3 can be optimized according to the state of the pneumatic circuit 100. As a result, even in a case where the state of the pneumatic circuit 100 suddenly changes, it is possible to prevent the piston 34 and the cylinder 33 from colliding with each other and the discharge flow rate from decreasing, and the discharge flow rate and the compression efficiency suitable for the specifications of the linear compressor 3 can be secured.

Second Embodiment

Figure 6:
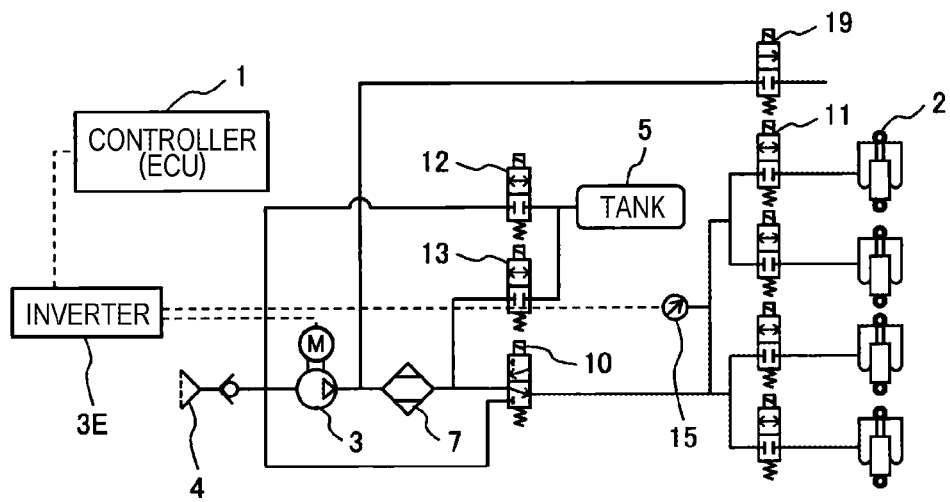
FIG. 6 is a circuit configuration diagram of the air suspension system of a second embodiment.

Next, the air suspension system according to a second embodiment of the present invention will be described with reference to FIGS. 6 and 7. Note that redundant description will be omitted for the common points with the first embodiment. FIG. 6 is a circuit configuration diagram of the air suspension system of the present embodiment, and FIG. 7 is a control block diagram of the air suspension system of the present embodiment.

In the first embodiment, the ECU 1 calculates the estimated load pressure based on the open and closed information of each solenoid valve, the measured pressure of the pressure sensor 15, and the like, and transmits this to the inverter 3C, so that the inverter 3C supplies a voltage corresponding to the open and closed state of each solenoid valve and the like to the linear motor 3B. On the other hand, in the present embodiment shown in FIG. 6, each solenoid valve and the pressure sensor 15 are connected to the inverter 3C, and the inverter 3C directly receives the open and closed information of each solenoid valve and the pressure information of the pressure sensor, so that the inverter 3C itself can obtain a voltage corresponding to the open and closed state of each solenoid valve and the like and supply the voltage to the linear motor 3B.

Figure 7:
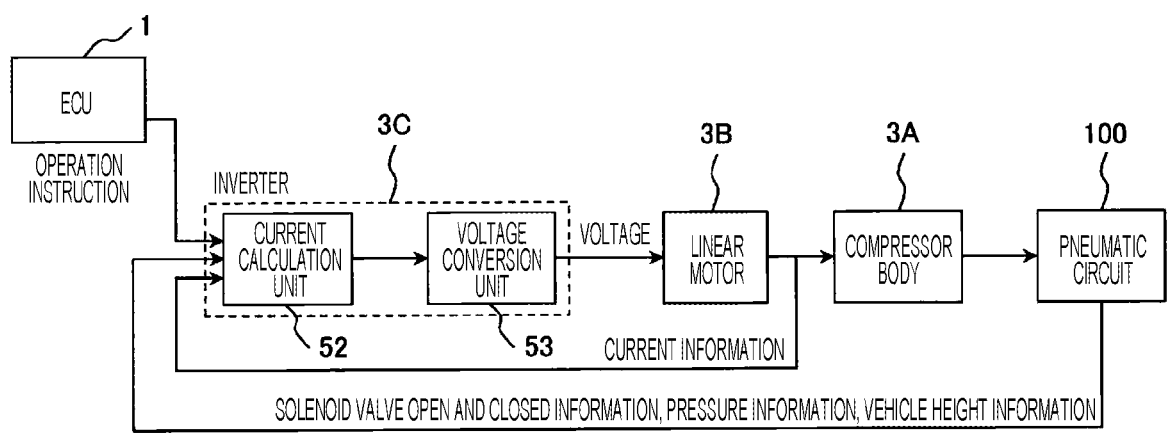
FIG. 7 is a control block diagram of the second embodiment.

For this reason, as shown in FIG. 7, the current calculation unit 52 of the inverter 3C receives an operation command of the linear compressor 3 from the ECU 1 and also receives solenoid valve open and closed information, pressure information, vehicle height information, and the like from the pneumatic circuit 100, and calculates and outputs a current value corresponding to them. The voltage conversion unit 53 generates a necessary voltage based on the current value input from the current calculation unit 52 and supplies it to the linear motor 3B. As a result, a current that causes the movable element 36 to reciprocate with an appropriate stroke flows through the coil 37 of the stator 39, and the compression operation of the linear compressor 3 is performed.

In order to determine the size of the stroke, the inverter 3C of the present embodiment estimates the pressure around the piston 34 based on one or a combination of a plurality of pieces of sensor information of motor current, motor voltage, position, and the like, in addition to the operation command of each solenoid valve. This can be estimated, for example, by detecting a counter electromotive voltage due to an increase in load. Based on this pressure estimated value, the current calculation unit 52 is configured to change the current flowing through the coil 37. Further, estimation of the pressure around the piston combining the open and closed information of the supply and discharge switching valve 10, the suspension control valve 11, the tank opening and closing valve 12, and the tank return opening and closing valve 13 and the pressure sensor 15 may be performed in a similar manner to the first embodiment. Further, the pressure in the compression chamber may be configured to be measured by a sensor or the like and directly taken in, and furthermore, information from a vehicle height sensor (not shown) provided in each suspension can be used for pressure estimation in the inverter 3C.

According to the air suspension system of the present embodiment described above, the drive control of the linear compressor 3 according to the situation of the pneumatic circuit 100 can be realized by the inverter 3C without providing the signal line connecting the ECU 1 and the pneumatic circuit 100. Therefore, an effect similar to that of the first embodiment can be obtained with a simple configuration.

Third Embodiment

Next, the air suspension system according to a third embodiment of the present invention will be described with reference to FIG. 8. Note that redundant description will be omitted for the common points with the first embodiment and the second embodiment.

Figure 8:
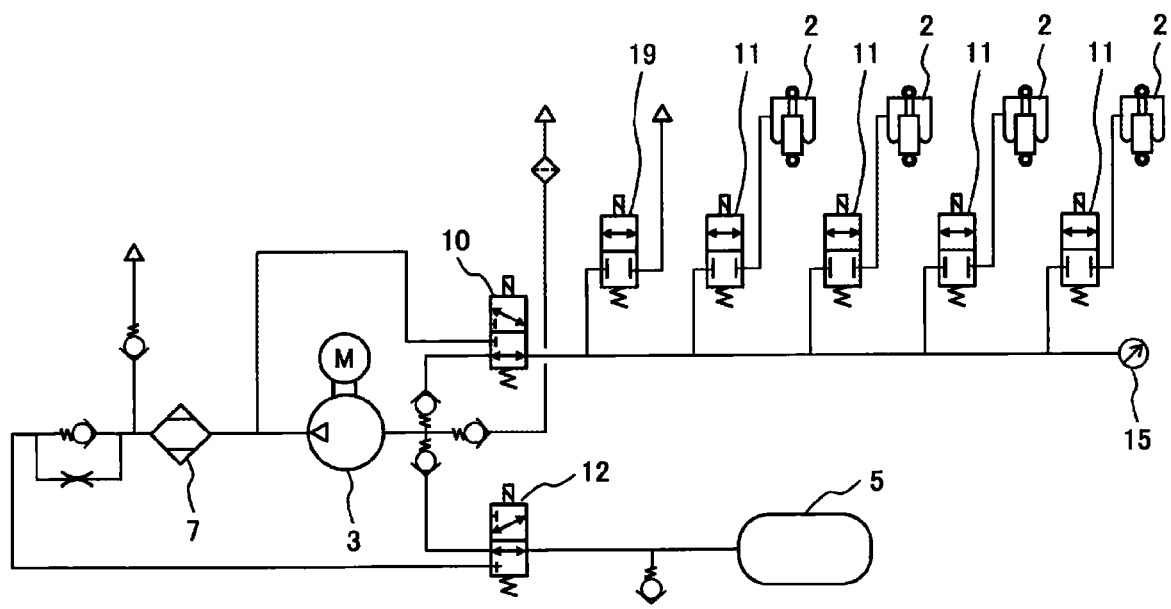
FIG. 8 is a circuit configuration diagram of the air suspension system of a third embodiment.

FIG. 8 is a circuit configuration diagram of the air suspension system of the present embodiment. As shown here, five two-way valves and two three-way valves, seven solenoid valves in total, are used. The pneumatic circuit 100 shown here is a circuit that switches pipes connected to the tank 5 by using the tank opening and closing valve 12 that is a three-way valve, instead of omitting the tank return opening and closing valve 13 of the first embodiment.

In the pneumatic circuit 100, there are restrictions as compared with the first embodiment, such as that compressed air cannot be directly supplied from the linear compressor 3 to the air suspension 2, and compressed air must be supplied via the tank 5. However, since the tank return opening and closing valve 13 can be omitted, it is possible to provide, at a lower cost, the air suspension system by which an effect similar to that of the first embodiment can be obtained.

Fourth Embodiment

Next, the air suspension system according to a fourth embodiment of the present invention will be described with reference to FIG. 9. Note that redundant description will be omitted for the common points with the embodiments described above.

Figure 9:
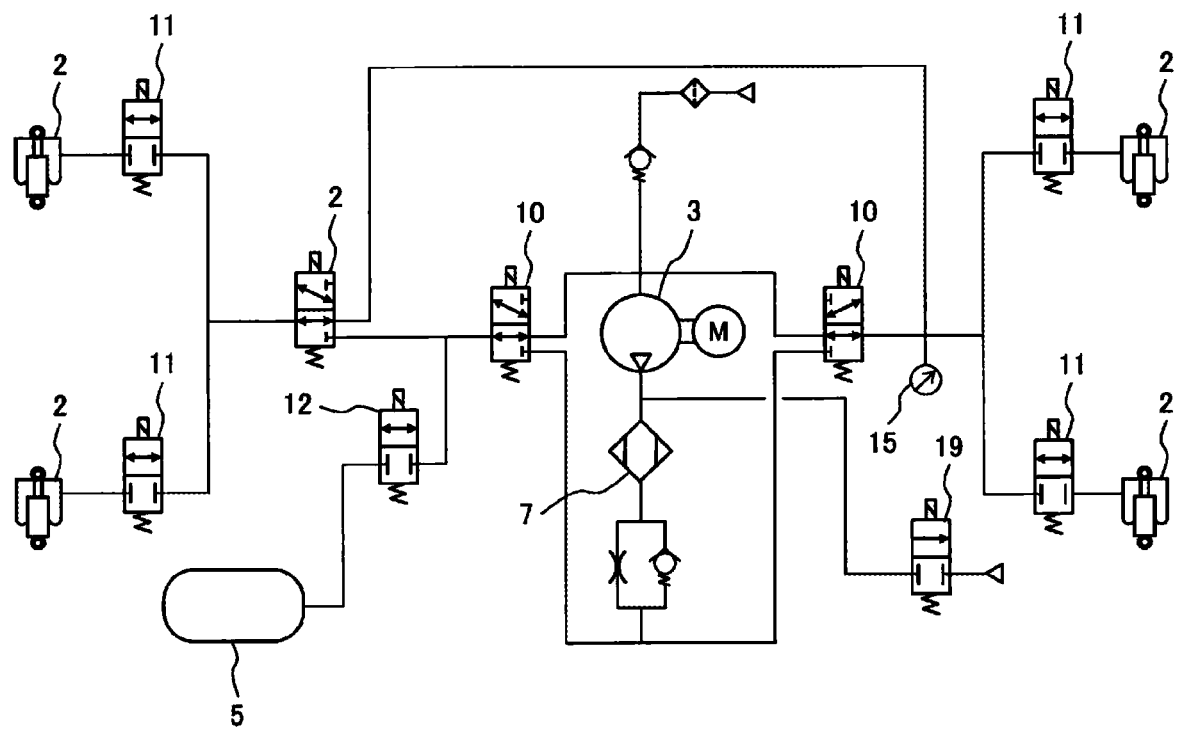
FIG. 9 is a circuit configuration diagram of the air suspension system of a fourth embodiment.

FIG. 9 is a circuit configuration diagram of the air suspension system of the present embodiment. As shown here, six two-way valves and three three-way valves, nine solenoid valves in total, are used.

The present embodiment has a circuit configuration in which the compressed air in the tank 5 can be directly supplied to the air suspension 2 without the linear compressor 3. Therefore, by accumulating sufficiently high-pressure compressed air in the tank 5, the vehicle height increasing operation can be performed only with the air supplied from the tank 5. Further, since it has a circuit that can supply compressed air from the tank 5 to two of the air suspensions 2 as well as to the linear compressor 3, it is possible to supply the compressed air from the linear compressor 3 to the other two of the air suspensions 2. For this reason, a configuration where, for example, the front wheel air suspension draws compressed air from the tank 5, and the rear wheel air suspension draws compressed air from the linear compressor 3 can be obtained, and the amount of air supplied to each air suspension is increased. Accordingly, it is possible to perform the vehicle height increasing operation more promptly.

Fifth Embodiment

Next, the air suspension system according to a fifth embodiment of the present invention will be described with reference to FIG. 10.

Figure 11:
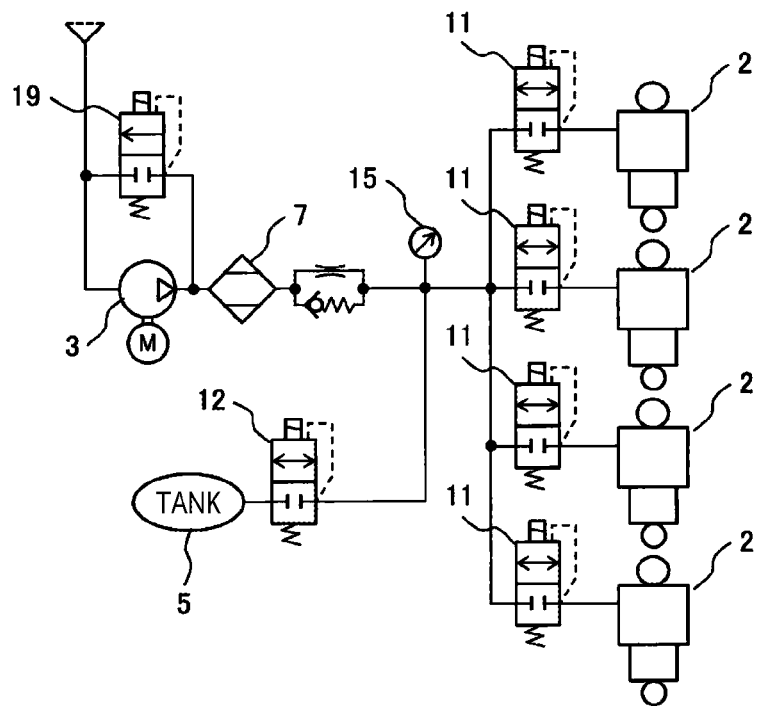
FIG. 11 is a circuit configuration diagram of the air suspension system of a sixth embodiment.

Note that redundant description will be omitted for the common points with the embodiments described above. FIG. 11 is a circuit configuration diagram of the air suspension system of the present embodiment. As shown here, the tank 5 or a three-way valve is not used, and five two-way valves are used.

Since the pneumatic circuit 100 of the present embodiment is a simple open pneumatic circuit in which the tank 5 is omitted, the linear compressor 3 is operated every time the vehicle height increasing operation is performed, and the outside air is sucked and the compressed air is supplied to the air suspension 2. Further, at the time of the vehicle height lowering operation, the exhaust passage opening and closing valve 19 is opened, and the air in the air suspension 2 is discharged to the outside of the pneumatic circuit 100 every time.

Figure 3C:
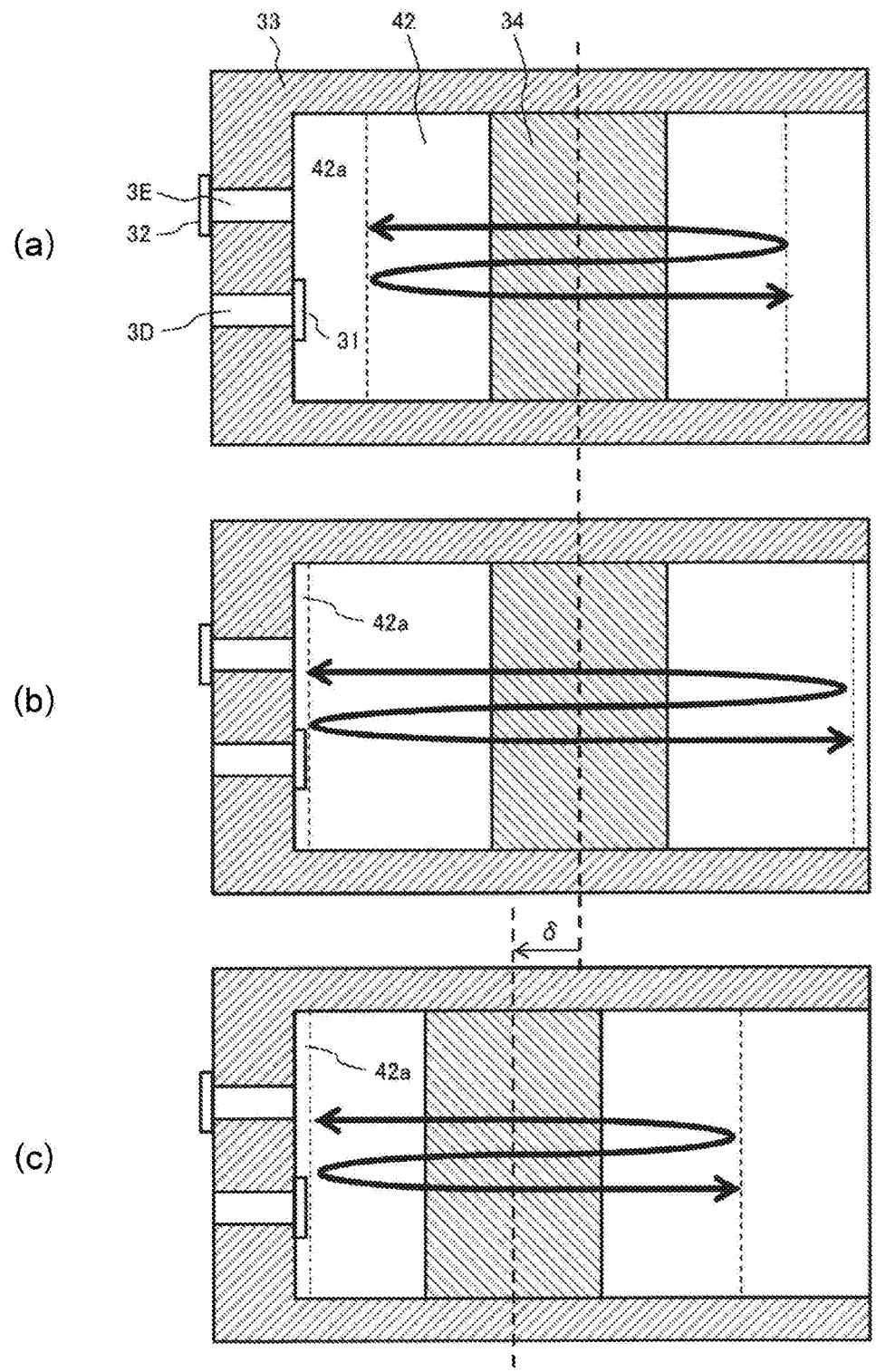
FIG. 3C is a comparison diagram of the behavior of a compressor body of the first embodiment.
Figure 10:
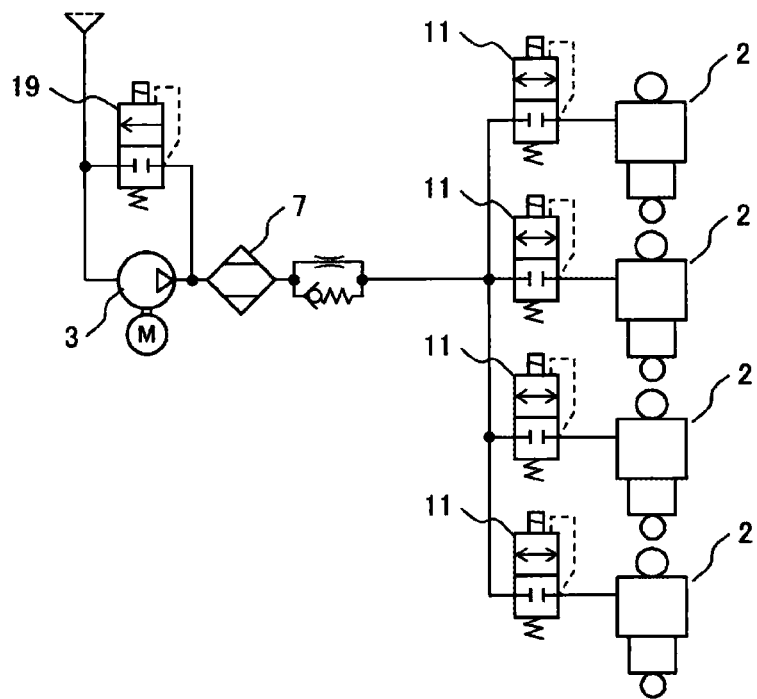
FIG. 10 is a circuit configuration diagram of the air suspension system of a fifth embodiment.

Even if the pneumatic circuit 100 is an open pneumatic circuit as shown in FIG. 10, by applying the control method of the linear compressor 3 described in FIGS. 3C(b), 3C(c), and the like, an effect similar to that of the first embodiment can be obtained.

Sixth Embodiment

Next, the air suspension system according to a sixth embodiment of the present invention will be described with reference to FIG. 11.

Note that redundant description will be omitted for the common points with the embodiments described above. FIG. 11 is a circuit configuration diagram of the air suspension system of the present embodiment. As shown here, a three-way valve is not used, and six two-way valves are used.

In the present embodiment, at the time of the vehicle height increasing operation, the compressed air in the tank 5 is first supplied to the air suspension 2, and operation of compensating the shortage by the compressed air obtained by compressing the outside air with the linear compressor 3 is performed. Further, at the time of the vehicle height lowering operation, air is supplied from the air suspension 2 to the tank 5, and after the pressure is equalized, the exhaust passage opening and closing valve 19 is opened so that the air inside the air suspension 2 is released to the outside of the pneumatic circuit 100 in an open circuit configuration. As compared with a simple open circuit configuration described later, part of the supply of compressed air at the time of the vehicle height increasing operation can be supplemented from the tank 5, and, while an effect similar to that of the first embodiment is obtained, the vehicle height increasing operation can be realized more promptly.

Seventh Embodiment

Figure 12:
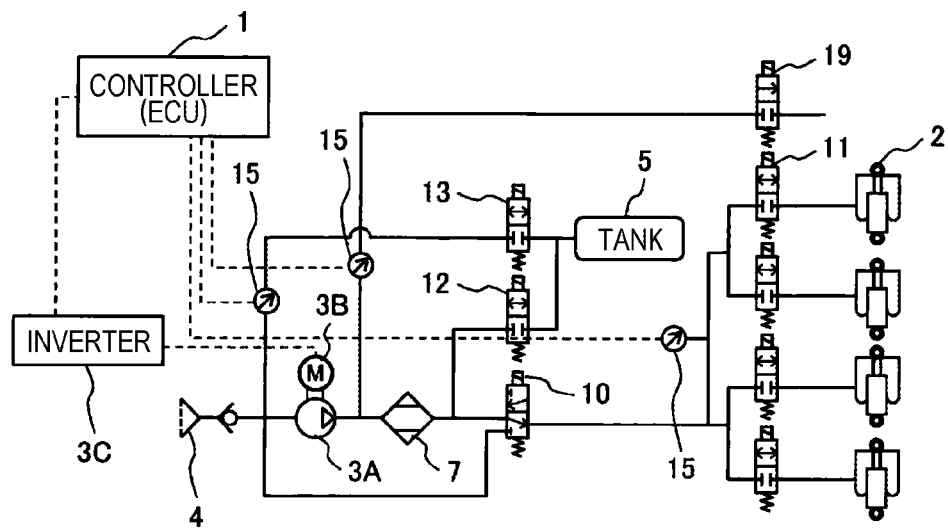
FIG. 12 is a circuit configuration diagram of the air suspension system of a seventh embodiment.

Next, the air suspension system according to a seventh embodiment of the present invention will be described with reference to FIG. 12.

Note that redundant description will be omitted for the common points with the embodiments described above.

The air suspension system of the present embodiment has the configuration shown in FIG. 12, in which two of the pressure sensors 15 for measuring the pressure in front of and behind the compressor body 3A are added to the configuration of the first embodiment described with reference to FIG. 2. In the first embodiment, the power supplied to the linear motor 3B is changed according to the open and closed state of each solenoid valve. However, the present embodiment has a configuration in which, based on the pressure information detected by the pressure sensor 15 provided near the compressor body 3A, the power supplied to the linear motor 3B is changed.

Specifically, in a case where there is a sudden change in the pressure difference between the pressure sensors 15 in front of and behind the compressor body 3A, or in a case where there is a sudden change in the pressure observed by the pressure sensor 15 behind the compressor body 3A, it is determined that the load on the linear compressor 3 is changed suddenly and the power supplied to the linear motor 3B is changed, so that the amplitude of the piston 36 can be optimized.

With the configuration of the present embodiment described above as well, an effect equivalent to that of the first embodiment can be obtained.

Eighth Embodiment

Next, with reference to FIG. 13, a camera cleaning system according to an eighth embodiment of the present invention will be described. Note that redundant description will be omitted for the common points with the embodiments described above.

In the first to seventh embodiments, as the application of the compressed air system of the present invention, the air suspension system in which the length of the air suspension 2 of the vehicle can be individually controlled by controlling the supply amount of the compressed air has been described. On the other hand, the present embodiment describes, as another application of the compressed air system of the present invention, the camera cleaning system capable of individually controlling the cleaning liquid amount sprayed by a camera cleaning device 6 of the vehicle by controlling the supply amount of the compressed air.

Figure 13:
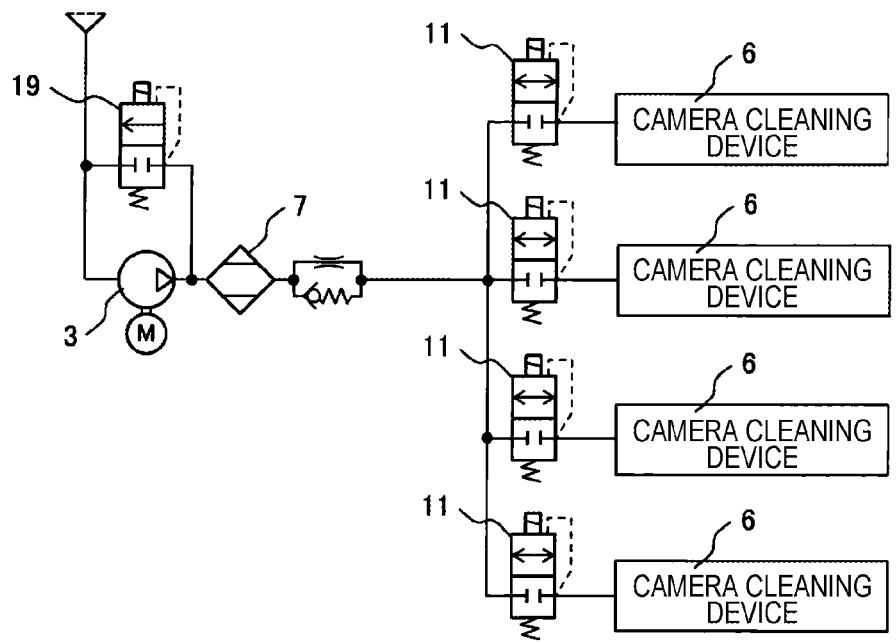
FIG. 13 is a circuit configuration diagram of a camera cleaning system of an eighth embodiment.

FIG. 13 is a schematic diagram of the camera cleaning system of the present embodiment. The vehicle of the present embodiment is equipped with, for example, on-vehicle cameras on the front, rear, left, and right, and the camera cleaning device 6 is mounted near each of them. Then, by the control of the ECU 1 (not shown), the supply amount of compressed air to the camera cleaning device 6 is individually adjusted, so that it is possible to appropriately adjust the cleaning liquid amount sprayed onto the lens surface of each on-vehicle camera. In this manner, it is possible to realize individual cleaning in such a manner that the front on-vehicle camera, which tends to get dirty, is cleaned with a large amount of cleaning liquid in a short cycle, while the on-vehicle camera of the official gazette, which is less likely to get dirty, is cleaned with a small amount of cleaning solution in a long cycle.

Here, the camera cleaning device 6 is specifically as disclosed in Japanese Patent No. 6090318, and discharges the cleaning liquid according to the amount of compressed air supplied to clean the lens surface of the on-vehicle camera. The present embodiment differs from the above-described embodiment in which the compressed air is supplied to the air suspension 2 in that the compressed air is supplied to the camera cleaning device 6, and is in common with the above-described embodiment with respect to the point that the compressed air generated by one of the linear compressor 3 is supplied to a plurality of parts and its control content is also similar. Accordingly, in the present embodiment, a specific control method of the linear compressor 3 that overlaps with the above-described embodiment is omitted.

Note that the present invention is not limited to the above embodiments and includes a variety of variations.

For example, the above embodiments are described in detail for easy understanding of the present invention, and the present invention is not necessarily limited to embodiments that include all the described configurations. Further, part of a configuration of a certain embodiment can be replaced with a configuration of another embodiment, and a configuration of a certain embodiment can also be added to a configuration of another embodiment. Further, for part of a configuration of each embodiment, other configurations may be added, removed, or replaced.

REFERENCE SIGNS LIST

1 ECU
2 air suspension
3 linear compressor
3A compressor body
3B linear motor
3C inverter
3D suction port
3E discharge port
4 intake filter
5 tank
6 camera cleaning device
7 air dryer
10 supply and discharge switching valve
11 suspension control valve
12 tank opening and closing valve
13 tank return opening and closing valve
15 pressure sensor
19 exhaust passage opening and closing valve
31 intake valve
32 exhaust valve
33 cylinder
34 piston
35 connection portion
36 movable element
36a end portion
37 coil
38 permanent magnet
39 stator
39a end portion
40 spring
41 iron core
42 compression chamber
42a dead volume
43A upper magnetic pole tooth portion
43B lower magnetic pole tooth portion
44 gap
44a, 44b gap 45a, 45b magnetic flux
46A repulsive force
46B suction force
52 current calculation unit
53 voltage conversion unit
100 pneumatic circuit
101 vehicle
102 vehicle body
103 wheel

The invention claimed is:

1. An air suspension system comprising:
an air suspension that supplies and discharges compressed air to adjust a length;
a compressor body in which a piston reciprocates in a cylinder to compress air;
a linear motor that reciprocates the piston;
a tank that is connected to the air suspension or the compressor body and stores compressed air;
a solenoid valve that opens and closes the air suspension or the tank; and
an inverter configured to:
receive an operation command and an estimated load value, the estimated load value being based on a current or future open and closed state of the solenoid valve,
calculate, based on the operation command and the estimated load value, an amount of power to be supplied, and
supply the power to the linear motor to perform position control of the piston;
detect a counter electromotive voltage due to an increase in load;
determine a pressure estimation value of the pressure around the piston based on the counter electromotive voltage; and
change the amount of power supplied to the linear motor perform position control of the piston, the position control being an adjustment of a stroke size of the piston.

2. The air suspension system according to claim 1, wherein the position control of the piston is an adjustment of an amplitude center position or an amplitude of the piston.

3. The air suspension system according to claim 1, further comprising:
a supply and discharge switching valve that switches an air inflow direction to the air suspension; or
an exhaust passage opening and closing valve that opens and closes an exhaust passage, wherein the inverter changes power supplied to the linear motor according to an open and closed state of the supply and discharge switching valve or the exhaust passage opening and closing valve to perform position control of the piston.

4. The air suspension system according to claim 1, wherein
the air suspension system further comprises a pressure sensor that measures pressure on a suction side or a discharge side of the compressor body, and
the inverter changes power supplied to the linear motor according to a measurement result of the pressure sensor to perform position control of the piston.

5. The air suspension system according to claim 1, wherein
the air suspension increases and lowers a vehicle height installed between a vehicle body and a wheel, and the inverter changes power supplied to the linear motor according to a vehicle height measured by a vehicle height sensor to perform position control of the piston.

6. The air suspension system according to claim 1, wherein
the air suspension is a front wheel side air suspension installed between a vehicle body and a front wheel, and a rear wheel side air suspension installed between the vehicle body and a rear wheel, and
the inverter changes power supplied to the linear motor to perform position control of the piston when compressed air is supplied to the front wheel side air suspension and when compressed air is supplied to the rear wheel side air suspension.

7. The air suspension system according to claim 1, wherein
the air suspension is a front wheel side air suspension installed between a vehicle body and a front wheel, and a rear wheel side air suspension installed between the vehicle body and a rear wheel, and
the inverter changes power supplied to the linear motor to perform position control of the piston when compressed air is exhausted from the front wheel side air suspension and when compressed air is exhausted from the rear wheel side air suspension.

8. An air suspension system comprising:
an air suspension that supplies and discharges compressed air to adjust a length;
a compressor body in which a piston reciprocates in a cylinder to compress air;
a pressure sensor that detects pressure information of the compressor body;
a linear motor that reciprocates the piston;
a tank that is connected to the air suspension or the compressor body and stores compressed air;
a solenoid valve that opens and closes the air suspension or the tank; and
an inverter configured to:
receive an operation command and an estimated load value, the estimated load value being based on the pressure information and a current or future open and closed state of the solenoid valve,
calculate, based on the operation command and the estimated load value, an amount of power to be supplied, and
supply the power to the linear motor to perform position control of the piston;
detect a counter electromotive voltage due to an increase in load;
determine a pressure estimation value of the pressure around the piston based on the counter electromotive voltage; and
change the amount of power supplied to the linear motor perform position control of the piston, the position control being an adjustment of a stroke size of the piston.

9. An air suspension system comprising:
an air suspension that supplies and discharges compressed air to adjust a length;
a compressor body in which a piston reciprocates in a cylinder to compress air;
a linear motor that reciprocates the piston;
a solenoid valve that opens and closes the air suspension; and
an inverter configured to:
receive an operation command and an estimated load value, the estimated load value being based on a current or future open and closed state of the solenoid valve, calculate, based on the operation command and the estimated load, an amount of power to be supplied, and supply the power to the linear motor to perform position control of the piston;

detecting a counter electromotive voltage due to an increase in load;

determining a pressure estimation value of the pressure around the piston based on the counter electromotive voltage; and changing the amount of power supplied to the linear motor to perform position control of the piston, the position control being an adjustment of a stroke size of the piston.

10. A camera cleaning system comprising:

a camera cleaning device that sprays cleaning liquid when compressed air is supplied and discharged;

a compressor body in which a piston reciprocates in a cylinder to compress air;

a linear motor that reciprocates the piston;

a solenoid valve that adjusts an amount of compressed air supplied to the camera cleaning device; and an inverter configured to:

receive an operation command and an estimated load value, the estimated load value being based on a current or future open and closed state of the solenoid valve, calculate, based on the operation command and the estimated load value, an amount of power to be supplied, and supply the power to the linear motor to perform position control of the piston;

detect a counter electromotive voltage due to an increase in load;

determine a pressure estimation value of the pressure around the piston based on the counter electromotive voltage; and change the amount of power supplied to the linear motor perform position control of the piston, the position control being an adjustment of a stroke size of the piston.

11. The camera cleaning system of claim 10, wherein the camera cleaning device discharges the cleaning liquid according to the amount of compressed air supplied.

12. The camera cleaning system of claim 10, further comprising a plurality of camera cleaning device each configured to sprays cleaning liquid when compressed air is supplied and discharged.

13. The camera cleaning system of claim 12, wherein each camera cleaning device is mounted near an on-vehicle camera.

14. The camera cleaning system of claim 12, wherein the supply of compressed air is adjusted for each of the plurality of camera cleaning devices.

* * * * *